United States Patent
van der Laan et al.

(10) Patent No.: US 9,836,486 B2
(45) Date of Patent: Dec. 5, 2017

(54) POINT OF INTEREST DATABASE MAINTENANCE SYSTEM

(71) Applicant: TomTom International B.V., Amsterdam (NL)

(72) Inventors: Antoine Carl van der Laan, Lelystad (NL); Richard Hendrik Josephus Jonkman, Voorhout (NL)

(73) Assignee: TomTom Traffic B.V., Amsterdam (NL)

( * ) Notice: Subject to any disclaimer, the term of this patent is extended or adjusted under 35 U.S.C. 154(b) by 232 days.

(21) Appl. No.: 14/383,683

(22) PCT Filed: Mar. 7, 2013

(86) PCT No.: PCT/EP2013/054659
§ 371 (c)(1),
(2) Date: Sep. 8, 2014

(87) PCT Pub. No.: WO2013/132031
PCT Pub. Date: Sep. 12, 2013

(65) Prior Publication Data
US 2015/0088814 A1 Mar. 26, 2015

(30) Foreign Application Priority Data
Mar. 7, 2012 (GB) .................................. 1204006.9

(51) Int. Cl.
*G06F 17/30* (2006.01)
*G01C 21/32* (2006.01)
(Continued)

(52) U.S. Cl.
CPC ....... *G06F 17/30289* (2013.01); *G01C 21/32* (2013.01); *G01C 21/3679* (2013.01);
(Continued)

(58) Field of Classification Search
CPC ......... G06F 17/30371; G06F 17/30598; G06F 17/30365; G06F 17/303; G06F 17/30345
(Continued)

(56) References Cited

U.S. PATENT DOCUMENTS

| 5,164,904 A | 11/1992 | Sumner |
| 5,182,555 A | 1/1993 | Sumner |

(Continued)

FOREIGN PATENT DOCUMENTS

| WO | 0155744 A2 | 8/2001 |
| WO | 2010040390 A1 | 4/2010 |

(Continued)

OTHER PUBLICATIONS trapster.com/gettingstarted.php retrieved from web site on Mar. 7, 2012.

(Continued)

*Primary Examiner* — Syed Hasan
*Assistant Examiner* — Nicholas Allen

(57) ABSTRACT

A method of processing data at a server 302 for maintenance of a database 516 of points of interest, such as speed limit enforcement devices. Each of the devices represented in the database has at least one attribute and a confidence value indicative of the accuracy of the at least one attribute associated therewith. The confidence value is time dependent and varies according to a predefined decay function. A report 500 relating to an attribute of a speed limit enforcement device is received at the server 302 from a mobile device 200. The confidence value associated with the speed limit enforcement device is adjusted in accordance with the received report, and information relating to the speed limit enforcement device 520, 522 is selectively transmitted to the or another mobile device 200 based on the confidence value.

18 Claims, 5 Drawing Sheets

(51) Int. Cl.
  *G01S 7/02*      (2006.01)
  *G08G 1/01*      (2006.01)
  *G08G 1/0967*    (2006.01)
  *G08G 1/00*      (2006.01)
  *H04W 4/02*      (2009.01)
  *G01C 21/36*     (2006.01)

(52) U.S. Cl.
  CPC ........ *G01S 7/022* (2013.01); *G06F 17/30371* (2013.01); *G08G 1/012* (2013.01); *G08G 1/0112* (2013.01); *G08G 1/0141* (2013.01); *G08G 1/096716* (2013.01); *G08G 1/096741* (2013.01); *G08G 1/096775* (2013.01); *G08G 1/20* (2013.01); *H04W 4/02* (2013.01)

(58) Field of Classification Search
  USPC .......................................................... 707/609
  See application file for complete search history.

(56) References Cited

U.S. PATENT DOCUMENTS

| | | | |
|---|---|---|---|
| 6,675,085 B2 | 1/2004 | Straub | |
| 7,805,242 B2 | 9/2010 | Fujimoto | |
| 8,099,466 B2 | 1/2012 | Tenereillo | |
| 8,255,155 B1* | 8/2012 | Crane | G08G 1/096716 340/905 |
| 8,306,729 B2 | 11/2012 | Liu | |
| 2002/0022920 A1 | 2/2002 | Straub | |
| 2003/0052797 A1* | 3/2003 | Rock | G01C 21/3697 340/936 |
| 2006/0075023 A1 | 4/2006 | Tenereillo | |
| 2007/0124064 A1 | 5/2007 | Fukui et al. | |
| 2007/0216521 A1* | 9/2007 | Guensler | G08G 1/0104 340/439 |
| 2007/0299606 A1 | 12/2007 | Fujimoto | |
| 2008/0082472 A1* | 4/2008 | Dalton | G06K 9/00785 706/45 |
| 2008/0248815 A1* | 10/2008 | Busch | H04W 4/02 455/456.5 |
| 2009/0162824 A1* | 6/2009 | Heck | G06Q 10/10 434/322 |
| 2009/0177379 A1 | 7/2009 | Jones | |
| 2010/0214149 A1* | 8/2010 | Kuhn | G01S 7/022 342/20 |
| 2010/0317420 A1 | 12/2010 | Hoffberg | |
| 2011/0087427 A1 | 4/2011 | Liu | |
| 2012/0103780 A1* | 5/2012 | Ali | C09C 1/482 201/3 |
| 2012/0158746 A1* | 6/2012 | Johnson | G01C 21/32 707/748 |
| 2012/0190380 A1 | 7/2012 | Dupray | |
| 2012/0268306 A1* | 10/2012 | Coburn | G01S 7/022 342/20 |
| 2013/0007135 A1* | 1/2013 | Tenereillo | G06Q 10/06 709/205 |
| 2013/0009760 A1* | 1/2013 | Washlow | G01S 7/003 340/425.5 |

FOREIGN PATENT DOCUMENTS

| | | |
|---|---|---|
| WO | 2010133811 A1 | 11/2010 |
| WO | 2011023719 A1 | 3/2011 |
| WO | 2011071826 A1 | 6/2011 |
| WO | 2011079247 A1 | 6/2011 |

OTHER PUBLICATIONS

International Search Report dated May 17, 2013 for International Application No. PCT/EP2013/054659.
International Search Report dated May 17, 2013 for International Application No. PCT/EP2013/054662.
Search Report dated Nov. 9, 2012 for United Kingdom Application No. GB1204006.9.

* cited by examiner

POINT OF INTEREST DATABASE MAINTENANCE SYSTEM

CROSS-REFERENCES TO RELATED APPLICATIONS

This application is the National Stage of International Application No. PCT/EP2013/054659, filed Mar. 7, 2013 and designating the United States. The application claims priority from United Kingdom Patent Application No. 1204006.9, filed Mar. 7, 2012. The entire content of both these applications is incorporated herein by reference.

FIELD OF INVENTION

The present invention, at least in some aspects, relates to methods and systems of processing data for maintenance of a database of points of interest, such as speed limit enforcement devices. Other aspects of the invention relate to the maintenance of similar data that is temporary or dynamical in nature, such as the availability of parking spaces or the availability and status of electric vehicle charging stations.

BACKGROUND TO THE INVENTION

Portable navigation devices (PNDs) that include GNSS (Global Navigation Satellite Systems) signal reception and processing functionality are well known and are widely employed as in-car or other vehicle navigation systems. Such devices include a GNSS antenna, such as a GPS antenna, by means of which satellite-broadcast signals, including location data, can be received and subsequently processed to determine a current location of the device. The device may also include electronic gyroscopes and accelerometers which produce signals that can be processed to determine the current angular and linear acceleration. The determined acceleration may then be used in conjunction with location information derived from the GPS signal to determine the velocity and relative displacement of the device and thus vehicle in which it is typically mounted. Such sensors are most commonly provided in in-vehicle navigation systems, but may also be provided in the PND itself.

In recent years, GPS has also been used in systems to warn drivers of speed traps, enforcement cameras and road hazards, such as school zones, accident black spots, etc. In such systems, a device having a GPS antenna and access to a database containing the location of speed traps, accident black spots, etc is typically provided in a vehicle. The device is configured to provide warnings to a driver when the vehicle, using the location information derived from the GPS signal, is in the vicinity of one of the locations stored in the database. One such system is described, for example, in WO 01/55744 A2.

As will be appreciated by those skilled in the art, one of the important aspects of such systems is the accuracy and freshness of the information in the database. For example, it is undesirable to provide a warning to a user of a speed camera that is no longer present on the stretch of road, or to incorrectly indicate the speed limit on a stretch road associated with a speed camera in the database. In an effort to improve accuracy and freshness of such data, it is known to collect and utilise reports from drivers and other users indicating the presence or absence of speed cameras, and to provide this updated information to other members of the community in a real-time manner.

An example of one such system is the Trapster® application for mobile devices, and which is described in detail at www.trapster.com. In this application, all users of the app are asked to report or validate the status of speed traps, enforcement cameras and the like. As result of these reports, a digital map can be shown to a user with various icons and colours representing different trap types, and in some cases their associated confidence levels. For example: a green trap icon is displayed to indicate the presence of an unverified trap; a yellow trap icon is displayed to indicate that a trap has been verified by another user; a red trap icon is displayed to indicate that a trap has been verified by multiple users, and thus has the highest confidence level associated with it. The application also allows users to report relatively short-lived hazards, such as: police traps, e.g. an active sighting of a police speed trap, or a police vehicle currently observing traffic; construction zones, e.g. road works; brush fires; road closures; children at play; icy roads; etc. These hazards are shown to other users, again by means of an icon on the digital map, but will automatically expire after a certain period of time following the last positive report from a user confirming its presence. The particular period of time that elapses before a hazard is no longer shown to a user varies based on the type of hazard. For example, a police trap expires after one hour, road closures after six hours and a construction zone after five days.

Despite the improvements in speed trap and enforcement camera warning systems through the use of so-called active community feedback, e.g. as described above in relation to the Trapster® application, the Applicant believes that there remains scope for further improvement, and in particular with respect to the accuracy and freshness of data in the associated database.

SUMMARY OF THE INVENTION

In accordance with a first aspect of the invention there is provided a method of processing data for maintenance of a database of points of interest (POI), each point of interest represented in the database having at least one attribute and a confidence value indicative of the accuracy of the at least one attribute associated therewith, wherein the confidence value is time dependent and varies according to a predefined function, the method comprising:

receiving a report relating to an attribute of a point of interest;

adjusting the confidence value associated with the point of interest in accordance with the received report; and transmitting information relating to the point of interest to a remote device based on the confidence value associated with the point of interest.

Further, and in accordance with another aspect of the invention there is provided a system, optionally a server system, arranged to process data for maintenance of a database of points of interest (POI), each point of interest represented in the database having at least one attribute and a confidence value indicative of the accuracy of the at least one attribute associated therewith, wherein the confidence value is time dependent and varies according to a predefined function, the system comprising:

communication means for receiving a report relating to an attribute of a point of interest; and means for adjusting the confidence value associated with the point of interest in accordance with the received report;

wherein the communication means is further arranged to transmit information relating to the point of interest to a remote device based on the confidence value associated with the point of interest.

The present invention in this further aspect may include any or all of the features described in relation to the first aspect of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors.

The present invention relates to the creation and maintenance of a database of points of interest (POI). The term "point of interest" takes it usual meaning within the art and thus refers to a permanent or temporary object at a particular location, e.g. point or region, that is of interest to a person or company. A POI may therefore be a building, such as a shop, tourist attraction or the like, or an area such as park. Similarly, a POI may be an object such as a speed limit enforcement device, e.g. a fixed speed camera (either individual cameras or as part of average speed zones), mobile speed camera, etc, or an dynamic advertising space (capable of displaying data sent to it from a remote location).

Each POI represented in the database has one or more associated attributes, preferably a plurality of such attributes. For example, in a preferred embodiment of the invention where the POI database is a database of speed limit enforcement devices, these attributes can include the type of speed camera, the location of the camera, the speed limit associated with the camera, and the driving direction associated with the camera. Each POI also has at least one associated confidence value which is indicative of the accuracy of one, some or all of the associated attributes.

The database, which is typically stored on a server or is accessible by a server, is maintained by receiving reports from various sources, such as mobile devices, data obtained from web crawlers, etc, containing information indicating whether the current attributes for a POI are correct or not. The system of the present invention therefore comprises communication means for transmitting data to, and receiving data from, a plurality of remote devices. These reports are used to adjust, e.g. increase or decrease, a confidence value associated with a POI in the database. The confidence value, as described below, ages according to a predefined function, such that the confidence value changes over time (even without reports being received for the POI).

Data relating to a POI is transmitted to one or more remote devices (e.g. devices, such as mobile devices, that are spatially remote from the database) in dependence on the confidence value for the POI. For example, when the confidence value for a particular POI falls below a predetermined threshold, then updated data relating to the POI may no longer be transmitted to remote devices. The transmitted data, as will be discussed in more detail below, is preferably indicative of least one of the confidence value or an attribute of the POI, and can be used, for example when the POI is a speed limit enforcement device, by the remote device to determine whether to provide alerts or warnings to a driver or not.

The use of confidence values that age according to a predefined function, and which can preferably also be adjusted positively or negatively following received reports, e.g. from mobile devices, moderators or third party data, enables a greater degree of control when fusing data from numerous sources to allow for an increased level of freshness and accuracy. For example, in the known arrangements described above, map data in the database is always present for a certain period of time following the last report from a user supporting the presence of the device. In contrast, in the present invention, a POI such as a speed limit enforcement device can rapidly be made inactive, i.e. such that no alerts or warnings are provided to a user, thereby reducing the number of false positives often experienced with such systems.

The method of the present invention relates to the maintenance of a database of points of interest. The invention will be described in the following passages in relation to a database of speed limit enforcement devices. It will be appreciated, however, that the methods of the invention are equally applicable to any type of point of interest, and are not limited only to speed limit enforcement devices. Accordingly, in the following, the term "speed limit enforcement device" can be replaced by the term "point of interest", unless the context requires otherwise.

The speed limit enforcement devices in the database can comprise any type of device that can be used to enforce the speed limit assigned to a road, such as a fixed devices, e.g. speed cameras, red lights cameras, and mobile devices, such as those contained in parked vehicles or held by law enforcement officers.

The method may be implemented by a processing resource of a server, e.g. with the database of speed limit enforcement devices being stored at the sever. Alternatively, or additionally if there are multiple databases, e.g. of differing levels of quality, richness (amount of detail), etc, one or more of the databases may be stored remotely from the server, but be accessible by the processing resource of the server via suitable communications link. The link may be a wireless link or a wired link or may comprise combinations thereof.

Each speed limit enforcement device in the database maintained according to the present invention has at least one attribute associated with it, together with a confidence value indicative of the accuracy of the least one attribute. In some embodiments, there may only be a single attribute associated with a speed limit enforcement device, although preferably at least some, and typically all, of the devices have a plurality of associated attributes.

The at least one attribute associated with a speed limit enforcement device can be one or more of: a device type; a location of the device; a speed limit; a driving direction indicating with which direction of vehicular travel the device operates (or in other words with which side of the road the device is positioned to monitor); a time period during which the device is operational; and an indication of the number of reports submitted by users in respect of the device.

The device type attribute may indicate that the device is any suitable and desired form of speed limit enforcement device. For example, the device type attribute may indicate that the device is a fixed speed camera, or that the device is a mobile speed camera. The device type attribute may also indicate whether the camera is used in conjunction with one or more other cameras as part of an average speed trap (i.e. where a vehicle's speed is monitored over a relatively long distance, such as a number of kilometers, to ensure that the average speed of the vehicle does not exceed the legal speed limit). As will be discussed in more detail below, the type of the speed limit enforcement device may be used to determine the confidence value decay profile to be used with a device.

The device location attribute indicates the geographic location of the speed limit enforcement device. The attribute may represent a point location, e.g. as a longitude and latitude pair, or with reference to a road segment in an electronic map. For example, the location could indicate that the speed limit enforcement device is a certain distance along a road segment of an electronic map, and may also indicate on which side of the road segment the device is located. The location reference could be made with respect to a particular electronic map, or the location reference could be map-agonistic by being generated using a dynamic location referencing method, such as AGORA-C or OpenLR®. The device location attribute may alternatively represent an area, instead of a point, such as a geographic area or a portion of a road segment. Such an area may be used, for example, where the speed limit enforcement device is part of an average speed trap; the area may therefore represent the road between the start and end of the average speed zone. An area could also be used when, for example, legislation within a territory does not permit a driver to know the exact location of a speed limit enforcement device, but only a zone having a device located therein.

The speed limit attribute indicates a speed limit associated with an enforcement device which may be used by a mobile device to provide suitable warnings to a user. The attribute may be the actual speed limit for the road on which the enforcement device is located, e.g. having been received from third party or Government data, or after having been confirmed from user reports or mobile mapping data. Alternatively, the speed limit attribute may be derived from position data received from vehicles travelling along the road segment on which the device is located. For example, the position data can be processed to determine an average speed for the road segment, and the speed limit attribute for the device is set, at least initially, as the determined average speed.

A speed limit enforcement device may have a plurality of speed limit attributes, e.g. if the speed limit for a road varies throughout the day, such as having a different value during hours of peak traffic; or if the speed limit for a road varies throughout the week, such as having a different value on the weekend. Similarly, a speed limit enforcement device may also have an associated temporal attribute that indicates times at which the device is operational. This may be beneficial in areas where construction work is taking place, and speed cameras are only active during periods when working is taking place.

The driving direction attribute may indicate that the speed limit enforcement device is only applicable when a driver is travelling in one direction along a road. Alternatively, the attribute may indicate that the device is applicable to vehicles travelling in both directions along a road. The absence of a driving direction attribute may similarly indicate that the device operates in both directions of travel.

The attribute providing an indication as to the number of reports submitted in respect of a device can take any form as desired. For example, the attribute may indicate one or more of: the total number of reports submitted for a device; the number of reports submitted in support of a device; and the number of reports submitted requesting deletion of a device. The attribute may be indicative of the number of reports received over the entire lifetime of a device in the database, or over a particular time period. For example, it is therefore envisaged that each received report may be binned into one of a plurality of temporal periods, such as weekly, daily, hourly, etc.

As will be appreciated, the database of speed limit enforcement devices in the present invention is continually being updated with new devices, or with changes to devices already existing in the database, based at least on reports from users. Speed limit enforcement devices can additionally be entered and/or modified in the database in a number of other possible ways.

For example, third party data could be used to supply the initial locations and attributes of speed limit enforcement devices. Moderators could also manually add speed limit enforcement devices to, or modify devices in, the database, e.g. after validating a user report indicating the presence of a device, or after identifying the presence of a device from aerial, satellite or mobile mapping vehicle images.

In addition, or alternatively, the presence of speed cameras could be inferred from changes in the vehicle speed.

For example, and as described in WO 2011/023719 A1, the entire contents of which is incorporated herein by reference, mobile devices carried by vehicles can detect a particular speed profile, such as a reduction in speed, followed by a substantially constant speed at or below the speed limit for the road, potentially followed by an increase in speed. A report may then be sent from the mobile device to a server indicating the location of the vehicle at the time the characteristic speed change is detected. The report could also include information relating to other attributes of a potential speed limit enforcement device, e.g. the direction of travel of the vehicle, the speed of the vehicle during the substantially constant speed phase of the profile, etc. Such reports may be used to add speed limit enforcement devices to, or modify devices in, the database of the present invention.

It is also envisaged that position data relating to the position of a vehicle at different times when travelling along a route, and which is received at a server, can be used to infer the presence of a speed limit enforcement device. Typically, such position data is obtained from a plurality of different vehicles. The position data received from multiple mobile devices travelling along the same navigable segment can be processed to infer the position of a speed limit enforcement device, e.g. by identifying changes in vehicle speed characteristic of a speed limit enforcement device. The determined speed limit enforcement device may then be added to the database, together with an associated confidence value. The associated confidence value may be such that warnings or alerts concerning a speed limit enforcement device inferred in this manner are not provided to drivers until at least one driver has confirmed the presence of the device. Further details concerning the calculation of confidence values, and how the confidence value effects the way in which a speed limit enforcement device is handled by the system, are provided below. One or more attributes associated with a speed limit enforcement device, in addition to a location, can also be inferred from the position data, e.g. a speed limit, driving direction, etc.

In the present invention, a confidence value is associated with each speed limit enforcement device in the database. The confidence value is representative of how certain it is that the device is actually present in reality and/or how certain it is that the attributes associated with the device are correct.

As will be appreciated, a device may have a single associated confidence value, or alternatively it may have a plurality of confidence values, e.g. one for each of the attributes associated with a device. If a device has a single associated confidence value, then this value may be indicative of the accuracy of a single attribute, but in a preferred embodiment it may represent a combined confidence value indicative of the accuracy of a plurality, and preferably each, of the attributes associated with the device.

The confidence value may take any suitable form, but preferably at any point in time it is a value between a minimum and maximum value, e.g. between 0 and 1, or between 0% and 100%. The minimum value indicating that there is no confidence in the attribute associated with the confidence value. Conversely, the maximum value indicating that there is no doubt as to the accuracy of the attribute associated with the confidence value.

In aspects of the present invention, the confidence value is not only time-dependent, i.e. varying in time due to the receipt of reports from mobile devices (and users thereof) either supporting, requesting changes to, or deletion of, a device in the database, but it also is arranged to vary according to a predefined function. In other words, when a speed limit enforcement device is added in the database, i.e. time t=0, it is assigned an initial confidence value $C(t=0) = C_0$. This initial confidence value then changes over time in dependence on a function $f(t)$, such that at a later point in time T, assuming no reports, either positive or negative, have been received for a device, then the device will have an effective confidence value:

$$C_{effective}(t=T) = f(T)C_0$$

Typically, however, reports will be received in respect of a device, and thus the confidence value for a device at a point in time T' will also be based, at least, on any received reports. Accordingly, the effective confidence value for a device will typically be:

$$C_{effective}(t=T) = f(T)C(T)$$

The predefined function can be of any suitable and desired form. For example, the predefined function can be a growth function, i.e. causing the confidence value to increase over time. In preferred embodiments of the invention, however, and for example in embodiments relating to speed limit enforcement devices, the predefined function is a decay function, i.e. causing the confidence value to decrease (or age) over time.

As will be appreciated, the term "confidence value" used herein will, unless the context requires otherwise, refer to the actual confidence value associated with a speed limit enforcement device in the database at a particular point in time. Accordingly, in embodiments where the confidence value changes according to a predefined function, e.g. decay or growth profile, the term "confidence value" will refer to the effective confidence value, i.e. wherein the confidence value determined as a result of user reports (and an initial confidence value) is further modified according to the decay or growth profile.

The initial confidence value for a device in the database can be determined in any suitable and desired manner. In preferred embodiment, however, the initial confidence value will be based on the manner in which the speed limit enforcement device is added to the database, or in other words the source of the speed limit enforcement device.

For example, in some embodiments, the initial confidence value may be fixed value, e.g. when the device is added based on third party data or by a moderator. In such circumstances, the initial confidence value will typically be relatively high, e.g. at or close to the maximum value, as the information obtained from these sources is typically of a high quality. A different fixed value may be used for each source, e.g. a first initial confidence value may be used when the data is obtained from a first company, whilst a second initial confidence value may be used when the data is obtained from a second different company.

In other embodiments, for example when the presence of a speed limit enforcement device is inferred from detected changes in vehicular speed, e.g. from the processing of received position data, the initial confidence value may be based on the received position data. Typically, the initial confidence value associated with devices added to the database from such sources will be relatively low.

In yet other embodiments, for example where the presence of a speed limit enforcement device is determined following the receipt of a report from a mobile device, the initial confidence value may be based on a trust level of the user who submitted the report. For example, a relatively high initial confidence value may be associated with a speed limit enforcement device if the user has a history of submitting high quality, accurate reports. Conversely, a relatively low confidence value may be associated with a device if the user has a history of submitting poor quality, inaccurate reports.

The predefined function, e.g. decay function, that is used to age the confidence value associated with a speed limit enforcement device in the database can also be of any suitable and desired form. For example, the decay function may be at least one of: a linear function, an exponential function, and a polynomial (e.g. quadratic, cubic, etc) function.

As will be appreciated, the confidence value of the present invention is preferably arranged to vary between a maximum and minimum value and may be at one or more intermediate values therebetween. Accordingly, a step (or Heaviside) function should not be considered to be a growth or decay function within the scope of the present invention.

The same function, e.g. decay function, may be used for all speed limit enforcement devices in the database, such that confidence in all devices decays at the same rate. Alternatively, in other embodiments, different functions may be used with different speed limit enforcement devices in the database. For example, a function may be selected for use with a device based on at least one attribute associated with the device, preferably the device type attribute. For example, a first decay function may be used with fixed speed limit enforcement devices, and a second decay function used with mobile speed limit enforcement devices. In such embodiments, the first decay function preferably decays slower than the second decay function, such that fixed devices should remain active in the system longer than mobile devices.

As will be appreciated, the server system of the present invention communicates with one or more remote devices to ensure that the data in the speed limit enforcement device database is accurate and up to date. The remote devices, i.e. devices that are spatially remote from the server system, can be of any suitable form. For example, the information from the server system may be sent to fixed location devices, e.g. home computers and the like. In a preferred embodiment, however, the remote devices are mobile devices that are preferably of a form where they can be carried or transported in a vehicle. The mobile devices may be portable devices, e.g. capable of being handheld, and which, for example, may be removably mounted within a vehicle. Alternatively, or additionally, the mobile devices may be in-vehicle systems, i.e. devices that are permanently mounted within vehicles.

As will be appreciated, the mobile devices are preferably capable of determining the current position of the device, and thus preferably comprise location determining means. The location determining means could be of any type. For example, a mobile device could comprise means for accessing and receiving information from WiFi access points or cellular communication networks, and using this information to determine its location. In preferred embodiments, however, a mobile device comprises a global navigation satellite systems (GNSS) receiver, such as a GPS receiver, for receiving satellite signals indicating the position of the receiver at a particular point in time, and which preferably receives updated position information at regular intervals.

The mobile devices may also include means for determining the relative displacement of the vehicle in which the device is carried, thereby allowing, for example, the speed and driving direction of the vehicle at any point in time to be determined. The means could comprise one or more electronic gyroscopes or accelerometers in the device, or the device could have access to such sensors in the vehicle itself, e.g. using the vehicle CAN bus.

Accordingly, in preferred embodiments, the mobile devices that are utilised in the present invention comprise navigation apparatus, such as portable navigation devices (PNDs) that can be removably mounted within a vehicle or in-vehicle navigation systems, and which preferably include GNSS signal reception and processing functionality. It will be appreciated, however, that the mobile devices may also comprise mobile telephones, PDAs, tablet computers or the like running suitable software programs.

The mobile devices also comprise communication means for transmitting and receiving information from the system, e.g. server, of the present invention. The information, as will be discussed in more detail below, may comprise reports indicating new speed limit enforcement devices or errors associated with speed limit enforcement devices already in the database. The information may comprise data indicative the confidence value, or effective confidence value, associated with a speed limit enforcement, and/or data indicative of an attribute associated with a speed limit enforcement device. The communication means could be of any type. For example, the devices may comprise one or more physical connector interfaces by means of which power and/or data signals can be transmitted to and received from the device. In preferred embodiments, however, the communication means comprises one or more wireless transmitters/receivers to allow communication over cellular telecommunications and other signal and data networks, for example WiFI, Wi-Max, GSM and the like.

As will be appreciated, the mobile devices also comprise means for alerting a user to the presence of a speed limit enforcement device, and optionally providing additional information relating to the device, such as the speed limit. The alert could be one or more of a visual alert, an audio alert and a haptic alert.

In embodiments of the present invention, reports are received from mobile devices containing information indicating the presence of a new speed limit enforcement device and/or whether the current attributes for a speed limit enforcement device are correct or not. These reports will typically be generated in response to a user input, e.g. by the user inputting information on a mobile device indicating a new speed limit enforcement device or an error in an already exiting device. It is also envisaged, however, that reports could be automatically generated, partially or fully, by the mobile device.

For example, in a preferred embodiment, a user may input on the mobile device the presence of a speed limit enforcement device, such as by pressing a hard button or soft (or virtual) key on the device. The user may additionally input one or more attributes associated with the speed limit enforcement device. Alternatively, or additionally, these other attributes may be automatically generated by the device, such as by setting the current vehicle location, speed and/or driving direction as the location, speed limit and driving direction attributes, respectively, for the device.

In other embodiments, and if, for example, the mobile device receives images of a vehicle's surroundings from a camera feed, image recognition techniques could be used to automatically determine the presence of speed limit enforcement devices on the images received from the camera feed.

Each received report preferably includes at least one modified or new attribute value associated with a speed limit enforcement device. Each report may include only a single attribute value for a device, or it may include a plurality of attribute values. As discussed above, one or more of the attribute values may be input by a user or be automatically generated by the mobile device.

Reports may be determined to relate to the same speed limit enforcement device using any suitable method. For example, if the location of the speed limit enforcement device in the report is within a predetermined distance of the location of a speed limit enforcement device already existing in the database, then the reports can be said to relate to the same device.

The received reports are preferably used to modify the attributes associated with a speed limit enforcement device and/or adjust, e.g. increase or decrease, as necessary, the confidence value of the speed limit enforcement device referred to the report.

The attributes associated with a speed limit enforcement device may be modified in any suitable and desired manner. For example, the location of the device may be modified so as to be the average of the current location and the location indicated in the report. Similarly, the speed limit of the device may be modified so as to be the average of the current speed limit and the speed limit indicated in the report. The average may be a weighted average, e.g. based on a trust level of the source of the report, such as the user that submitted the report.

The confidence value for a speed limit enforcement device at a particular point in time, before the impact of aging according to the predetermined function is taken into account, is, at least in part, dependent on reports received from mobile devices (and thus users) relating to the particular speed limit enforcement device. The confidence value can be calculated in any suitable manner, but preferably it will utilise one of more of the following: the number of positive reports received (where a positive report is one that supports the continued existence of a speed limit enforcement device in the system); the number of negative reports received (where a negative report is one that supports the removal of a speed limit enforcement device in the system); the ratio of positive reports received to negative reports; the age of a report (e.g. newer reports are viewed as being more relevant than older reports); and the confidence value associated with each individual attribute, e.g. a location confidence, a speed limit confidence and/or a type confidence.

The confidence value associated with a speed limit enforcement device in the database can be used in a number of advantageous ways in embodiments of the present invention. In particular, in the present invention, information relating to a speed limit enforcement device is transmitted to one or more remote devices based on the confidence value for the speed limit enforcement device in the database.

The information relating to a speed limit enforcement device may be of any suitable and desired form. For example, the information may be indicative of an attribute of a speed limit enforcement device, and may include: an attribute or attributes of a new device recently added to the database; or a recently changed attribute relating to speed limit enforcement device already existing in the database. Updated information relating to speed limit enforcement device can therefore be provided to users.

The information may, alternatively or additionally, be indicative of the confidence value of a speed limit enforcement device. For example, in a preferred embodiment, the confidence value associated with a speed limit enforcement device can be used as an indication that the device should be active in the database, i.e. the device continues to exist in reality, or inactive, i.e. the device no longer exists in reality, and thus whether a mobile device should provide warnings or alerts to a driver in relation to the speed limit enforcement device in question. In other words, when the confidence value of a speed limit enforcement device in the database falls below a predetermined threshold, then it is assumed that the device is no longer present in the real world, and drivers are no longer informed about the device. This therefore significantly reduces the number of false positive warnings that are commonly provided to drivers in known systems.

Thus, in embodiments of the invention, the method comprises transmitting an indication to one or more mobile devices that alerts relating to the presence of a speed limit enforcement device should no longer be issued to a user. The indication may be transmitted when the confidence value associated with the speed limit enforcement device is below a predetermined threshold. Alternatively, the indication may be transmitted each time there is a change in the confidence value of a speed limit enforcement device due to a received report.

The indication sent to the one or more mobile devices can be of any suitable and desired form. For example, in embodiments where the indication is transmitted when the confidence value falls below a threshold value, the indication could be a list of one or more devices that have changed from being active to inactive, or vice versa. Alternatively, if the indication is sent whenever there is a change in confidence value due to a received report, the server system may transmit an updated confidence value for an enforcement device, and the determination as to whether a speed limit enforcement device is active or inactive is made on the mobile device itself. In other embodiments, rather than sending an updated confidence value, the server system may transmit a time when alerts for a speed limit enforcement device are no longer to be issued; the time being based on when the current confidence value for the speed limit enforcement is due to fall below the threshold level according to the predetermined decay function.

As will be appreciated, when a device is made inactive in the database, it may actually be deleted from the database. Alternatively, the device may remain in the database, e.g. for future reference or to be made active again at a later date. For example, a mobile speed camera may be intermittently used for at the same location, and thus may be active or inactive at different times.

The information transmitted to one or more mobile devices may, alternatively or additionally, be a request to provide confirmation of an attribute of a speed limit enforcement device, or data that causes such a request to be generated on the mobile device. The attribute may include the presence of the speed limit enforcement, or it may relate to information about the device itself, such as the associated speed limit or driving direction. By actively requesting feedback from users to confirm information about, and in particular the presence of, a speed limit enforcement device, the confidence in a device can be quickly increased to a high level or decreased to a low level (such that the device can be made inactive in the database).

Thus, in embodiments of the invention, the method comprises transmitting a request to one or more mobile devices to provide confirmation of an attribute of a speed limit enforcement device when the confidence value associated with the speed limit enforcement device is below a predetermined threshold. A report is preferably received from one or more of the remote, e.g. mobile, devices in response to the request, and the confidence value associated with the speed limit enforcement device adjusted accordingly.

In other embodiments, the method comprises transmitting data to one or more mobile devices each time there is a change in the confidence value of a speed limit enforcement device due to a received report, the data causing a request to be generated on the mobile device to provide confirmation of an attribute of a speed limit enforcement device. The data may be a time when the request is to be provided to a user; the time being based on when the current confidence value for the speed limit enforcement is due to fall below the threshold level according to the predetermined decay function.

It is believed that the use of confidence values associated with points of interest, such as speed limit enforcement devices, to request feedback from users may be new and advantageous in its own right.

Thus, in accordance with a further aspect of the invention there is provided a method of processing data for maintenance of a database of points of interest (POI), each point of interest represented in the database having at least one attribute and a time-varying confidence value indicative of the accuracy of the at least one attribute associated therewith, the method comprising:

transmitting a request to one or more remote devices to provide confirmation of an attribute of a point of interest when the confidence value associated with the point of interest is below a predetermined threshold;

receiving a report relating to the attribute in response to the transmitted request; and adjusting the confidence value associated with the point of interest in accordance with the received report.

In accordance with another aspect of the invention there is provided a system, optionally a server system, arranged to process data for maintenance of a database of points of interest (POI), each point of interest represented in the database having at least one attribute and a time-varying confidence value indicative of the accuracy of the at least one attribute associated therewith, the system comprising:

communication means for transmitting a request to one or more remote devices to provide confirmation of an attribute of a point of interest when the confidence value associated with the point of interest is below a predetermined threshold; and means for adjusting the confidence value associated with the point of interest in accordance with a report received by the communication means in response to the transmitted request.

The present invention in any of these further aspects may include any or all of the preferred and optional features described herein as appropriate. For example, the points of interest in the database may be speed limit enforcement devices, and the attribute of the speed limit enforcement device can be any one or more of: the presence of the device; the device type; the location of the device; the speed limit associated with the device; the driving direction indicating with which direction of vehicular travel the device operates; and the time period during which the device is operational. In embodiments, the confidence value may also vary according to a predefined growth or decay function, such as a linear, exponential or polynomial function.

The means for carrying out any of the steps of the method may comprise a set of one or more processors configured, e.g. programmed, for doing so. A given step may be carried out using the same or a different set of processors to any other step. Any given step may be carried out using a combination of sets of processors.

In preferred embodiments of the invention, the system uses at least two predetermined thresholds with regard to the confidence value.

For example, in one embodiment, when the confidence value for a speed limit enforcement device falls below a first predetermined threshold, then a request is sent to one or more remote, e.g. mobile, devices to provide confirmation of an attribute of the speed limit enforcement device. Further, when the confidence value for a speed limit enforcement device falls below a second predetermined threshold, the second threshold being less than the first threshold, then an indication is transmitted to one or more remote, e.g. mobile, devices that alerts relating to the presence of a speed limit enforcement device should no longer be issued to a user.

In another embodiment, each time the confidence value for a speed limit enforcement device changes due to a received report, a plurality of time values can be sent to one or more remote, e.g. mobile, devices. The plurality of time values comprise a first time value indicating the time at which the confidence value of the speed limit enforcement device will fall below a first predetermined threshold (based on the predetermined decay function). At the time indicated by the first time value, a request will be generated and provided to a user on the mobile device asking for confirmation of an attribute of the speed limit enforcement device. The plurality of time values also comprise a second time value indicating the time at which the confidence value of the speed limit enforcement device will fall below a second predetermined threshold (based on the predetermined decay function), the second threshold being less than the first threshold. At the time indicated by the second time value, alerts relating to the presence of the speed limit enforcement device will no longer be issued to the user on the mobile device. The plurality of time values may also comprise a third time value indicating the time at which the confidence value of the speed limit enforcement device will fall to zero or another suitable value (based on the predetermined decay function). At the time indicated by the third time value, the speed limit enforcement device will be The above embodiments are described with reference to confidence values that age according to a predetermined decay function; thus actions are said to be taken when the confidence value falls below certain threshold levels. As will be appreciated, however, in embodiments where the confidence value varies according to a predetermined growth function, actions will in contrast be taken when the confidence value rises above certain threshold levels.

As will be appreciated from the above, information relating to speed limit enforcement devices is regularly transmitted to one or more remote, e.g. mobile, devices. This information may be transmitted to all mobile devices, whether the information will be of use to them in the near future or not. Preferably, however, the information relating to a speed limit enforcement device is transmitted only to devices that are, or will be, in the vicinity of the device. This therefore reduces the amount of information that needs to be transmitted to mobile devices.

Thus, for example, one or more mobile devices may provide the system, e.g. server, with location information relating to at least one of a current or future location. For example, a mobile device may provide a planned route of travel to the server. This location information can then be used by the system to select the mobile devices that should receive, preferably over the air (OTA) using wireless communication means, database changes and requests to confirm an attribute of speed limit enforcement devices. Accordingly, in embodiments, information relating to new and changed speed limit enforcement devices may be transmitted only to mobile devices that are or will be passing the locations associated with speed limit enforcement devices. Similarly, attribute confirmation requests may be transmitted only to mobile devices that have recently passed or will pass the particular speed limit enforcement device in question.

As will be appreciated, the present invention extends to a mobile device, optionally a navigation device, configured to operate with the system as described above.

Similarly, the present invention also extends to a database of points of interest (POI), such as speed limit enforcement devices, generated and/or maintained using the above described method of the present invention.

It will also be appreciated by those skilled in the art that all of the described aspects and embodiments of the present invention can, and preferably do, include, as appropriate, any one or more or all of the preferred and optional features described herein.

The methods in accordance with the present invention may be implemented at least partially using software. It will thus be seen that, when viewed from further aspects, the present invention extends to a computer program product comprising computer readable instructions adapted to carry out any or all of the methods described herein when executed on suitable data processing means, such as a server system.

The invention also extends to a computer software carrier comprising such software. Such a software carrier could be a physical (or non-transitory) storage medium or could be a signal such as an electronic signal over wires, an optical signal or a radio signal such as to a satellite or the like.

Although the present invention has been described in relation to maintaining a database of points of interest, and in particular speed limit enforcement devices, it will be appreciated that similar methods could be used with any information and/or map data that may, for example, be temporary in nature and/or requiring regular updates from users; in other words dynamic data. For example, it is envisaged that the methods of the present invention could be used to maintain a database of: parking spaces and/or parking areas, and the availability thereof; areas of construction or road works; electric vehicle charging stations, and the availability thereof; etc.

Thus, for example, in embodiments relating to parking spaces and/or parking areas, which comprise a plurality of parking spaces, the at least one attribute associated with each parking space and/or area can comprise one or more of: a location of the space and/or area; an availability of the space and/or area; and times when the space and/or area are available for use.

Similarly, in embodiments relating to electric vehicle charging stations, the at least one attribute associated with each charging station can comprise one or more of: a location of the charging station; an availability of the charging station; a type of the charging station (e.g. quick charge, slow charge, etc); and times when the charging station can be used.

It is also envisaged that the methods of the present invention can be used in dynamic signage, i.e. electronic displays that show information, such as television programs, menus, advertising, etc. In such embodiments, certain information could be displayed for longer periods of time based on a number of positive votes received from the general public.

The present invention in any of these further aspects may include any or all of the preferred and optional features described herein as appropriate.

The means for carrying out any of the steps of the method may comprise a set of one or more processors configured, e.g. programmed, for doing so. A given step may be carried out using the same or a different set of processors to any other step. Any given step may be carried out using a combination of sets of processors.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

Like reference numerals are used for the like features throughout the drawings.

DETAILED DESCRIPTION OF THE PREFERRED EMBODIMENTS

The present invention is directed to a method and system for processing data to maintain a database of speed limit enforcement devices. In order to keep the data in the database accurate and up to date, the system utilises information in the form of reports received from a plurality of mobile devices. In other words, the system relies on a community of users to continually supply information on new speed limit enforcement devices not already in the database, and to validate the details associated with the devices already in the database.

The mobile devices can be of any suitable form, but in illustrative embodiments are navigation apparatus, such as portable navigation devices (PNDs). Preferred embodiments of the present invention will now be described with particular reference to a PND. It should be remembered, however, that the teachings of the present invention are not limited to PNDs but are instead universally applicable to any type of processing device that is configured to warn or alert drivers when they are approaching speed limit enforcement devices using a local and/or remote database listing such devices. It follows therefore that in the context of the present invention, the mobile devices could be a PND, a navigation device built into a vehicle, or indeed a computing resource (such as a desktop, portable personal computer (PC), tablet computer, mobile telephone or portable digital assistant (PDA)).

Figure 1:
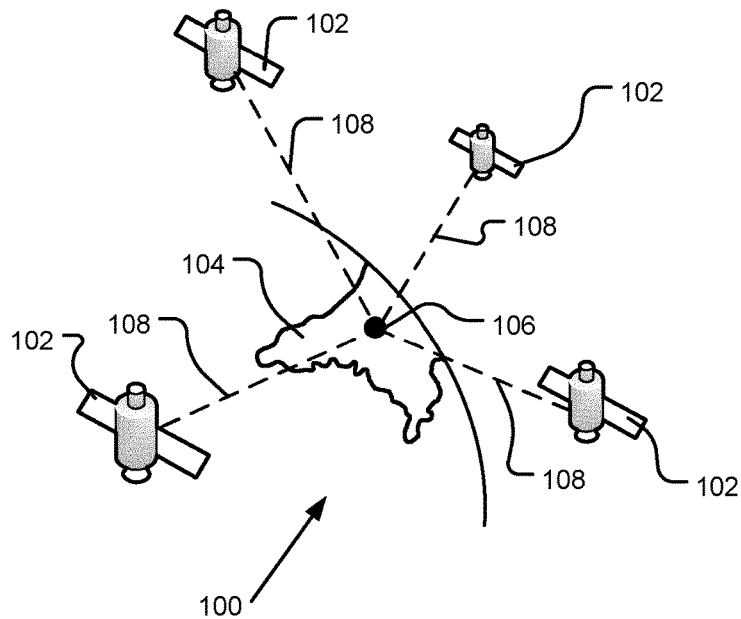
FIG. 1 is a schematic illustration of a Global Positioning System (GPS)

FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 102 are in orbit about the earth 104. The orbit of each satellite 102 is not necessarily synchronous with the orbits of other satellites 102 and, in fact, is likely asynchronous. A GPS receiver 106 is shown receiving spread spectrum GPS satellite signals 108 from the various satellites 102.

The spread spectrum signals 108, continuously transmitted from each satellite 102, utilize a highly accurate frequency standard accomplished with an extremely accurate atomic clock. Each satellite 102, as part of its data signal transmission 108, transmits a data stream indicative of that particular satellite 102. It is appreciated by those skilled in the relevant art that the GPS receiver device 106 generally acquires spread spectrum GPS satellite signals 108 from at least three satellites 102 for the GPS receiver device 106 to calculate its two-dimensional position by triangulation. Acquisition of an additional signal, resulting in signals 108 from a total of four satellites 102, permits the GPS receiver device 106 to calculate its three-dimensional position in a known manner.

Figure 2:
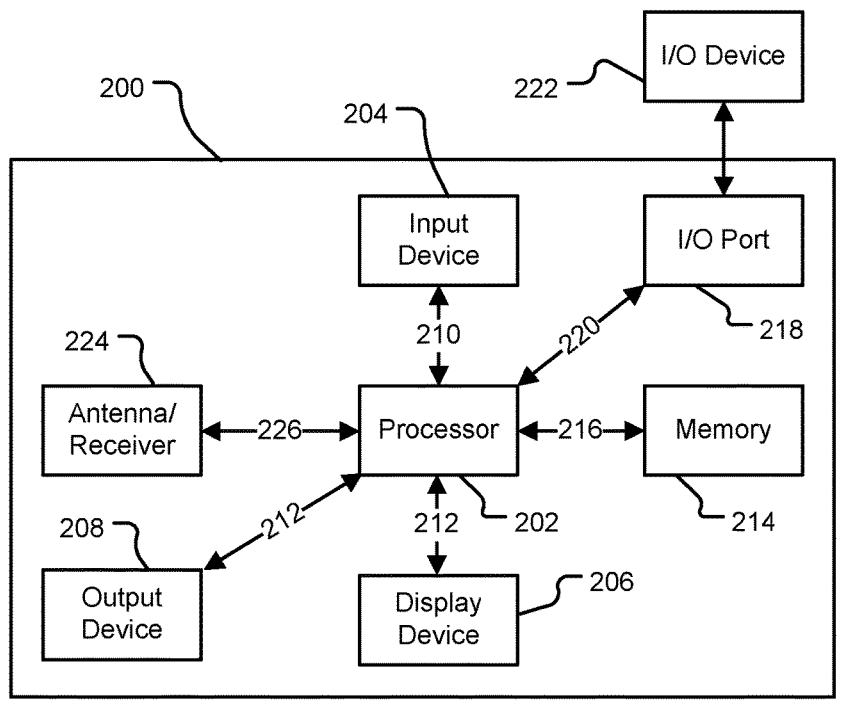
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 202 connected to an input device 204 and a display screen 206. The input device 204 can include a keyboard device, voice input device, touch panel and/or any other known input device utilised to input information; and the display screen 206 can include any type of display screen such as an LCD display, for example. In a particularly preferred arrangement the input device 204 and display screen 206 are integrated into an integrated input and display device, including a touchpad or touchscreen input so that a user need only touch a portion of the display screen 206 to select one of a plurality of display choices or to activate one of a plurality of virtual buttons.

The navigation device 200 may include an output device 208, for example an audible output device (e.g. a loudspeaker). As output device 208 can produce audible information for a user of the navigation device 200, it is should equally be understood that input device 204 can include a microphone and software for receiving input voice commands as well.

In the navigation device 200, processor 202 is operatively connected to and set to receive input information from input device 204 via a connection 210, and operatively connected to at least one of display screen 206 and output device 208, via output connections 212, to output information thereto. Further, the processor 202 is operably coupled to a memory resource 214 via connection 216 and is further adapted to receive/send information from/to input/output (I/O) ports 218 via connection 220, wherein the I/O port 218 is connectible to an I/O device 222 external to the navigation device 200. The memory resource 214 comprises, for example, a volatile memory, such as a Random Access Memory (RAM) and a non-volatile memory, for example a digital memory, such as a flash memory. The external I/O device 222 may include, but is not limited to an external listening device such as an earpiece for example. The connection to I/O device 222 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 202 and an antenna/receiver 224 via connection 226, wherein the antenna/receiver 224 can be a GPS antenna/receiver for example. It will be understood that the antenna and receiver designated by reference numeral 224 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

Figure 4:
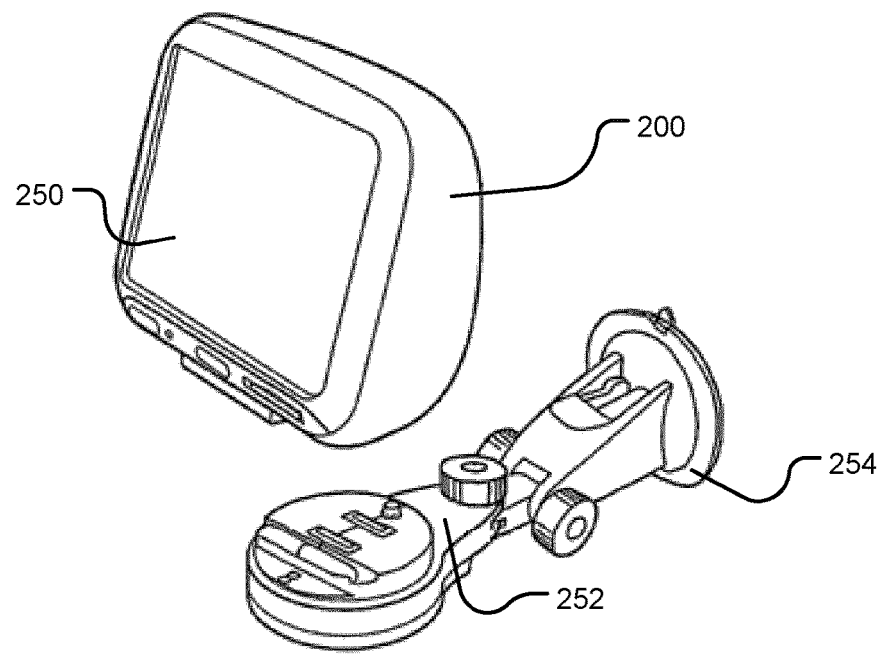
FIG. 4 is a perspective view of a navigation device.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use. As an example, FIG. 4 shows a navigation device 200 that may sit on an arm 252, which itself may be secured to a vehicle dashboard, window, etc using a suction cup 254. This arm 252 is one example of a docking station to which the navigation device 200 can be docked. The navigation device 200 can be docked or otherwise connected to the arm 252 of the docking station by snap connecting the navigation device to the arm, for example. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 3:
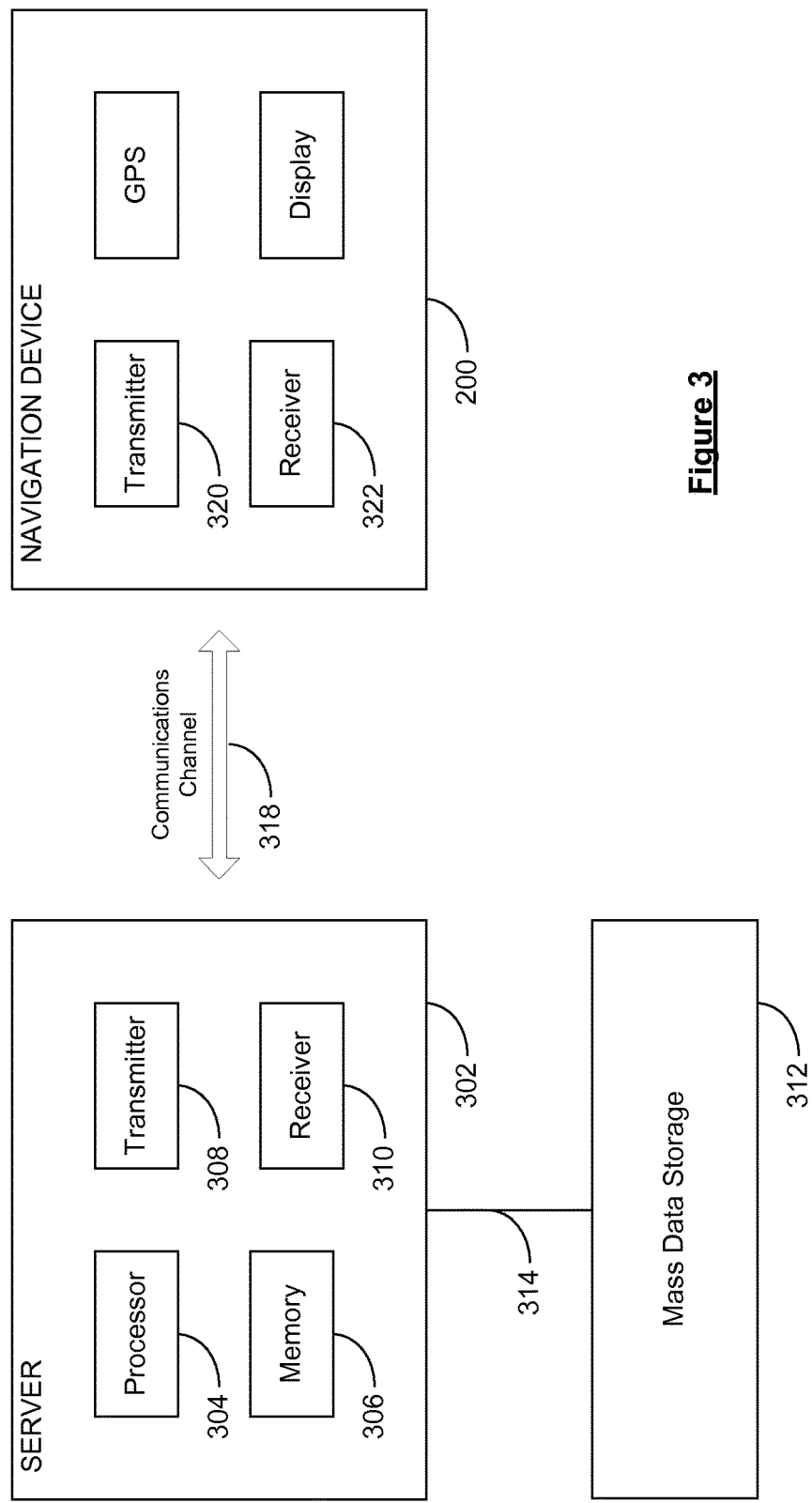
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc; model/manufacturer specific settings may be stored on the navigation device 200, for example. The data stored for this information can be updated.

In FIG. 3 the navigation device 200 is depicted as being in communication with the server 302 via a generic communications channel 318 that can be implemented by any of a number of different arrangements.

The server 302 and a navigation device 200 can communicate when a connection via communications channel 318 is established between the server 302 and the navigation device 200 (noting that such a connection can be a data connection via mobile device, a direct connection via personal computer via the internet, etc).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc. In other embodiments, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As is known in the art, the navigation device 200 may be configured to provide warnings when a vehicle is approaching a speed limit enforcement device, such as a mobile or fixed speed camera. In particular, the warning may be provided when the vehicle is approaching the speed limit enforcement device at a speed that is above the legal speed limit for the road. The warnings may comprise a visual warning on the display 206 of the navigation device 200, an audible warning, a haptic warning, or any combination thereof as desired. In order to provide such warnings, the navigation device has access to a database of speed limit enforcement devices, which includes at least the location of speed limit enforcement device and a speed limit for the device. The database will typically be stored on the navigation device 200, e.g. in the memory 214, and will be regularly updated with new data from the server 302 using the communication channel 318. It is envisaged, however, that the navigation device 200 may only temporary store portions of the database for speed limit devices in their immediate vicinity or a planned route.

The speed cameras in the database each have at least one attribute, and typically a plurality of attributes, associated therewith. The attributes can be, for example: a location of the speed camera; a speed limit associated with the camera; the side of the road on which the speed camera is operational; and the type of the speed camera (e.g. a fixed camera, a mobile camera, part of an average speed trap).

Due to the nature of speed cameras, e.g. new fixed speed cameras are continually being installed, fixed speed cameras may be moved to a new location, mobile speed cameras will often be in operation for short periods of time, etc, the information in the database on the server 302 needs to be constantly refreshed to ensure that it is accurate and up to date. To facilitate this process, speed cameras in the database each have an associated confidence value, which reflects how certain it is that the speed camera is actually still there in the real world and how certain it is that the attributes for the speed camera in the database are actually correct. The confidence value for a particular speed camera can take a value between 0% and 100%, where 0% means that there is completely no confidence in the camera and conversely 100% means that there is complete confidence in the camera.

As will be appreciated, the confidence value for a camera will change with time as reports are received from users either in support of, or requesting deletion of, the camera. A report in support of a camera will cause the confidence value to increase, while a report requesting deletion of a camera will cause the confidence value to decrease. It will be understood that a report supporting a camera may be a report simply confirming the presence of the camera or it may be a report requesting the modification of an attribute associated with the camera.

In addition to the confidence value varying in time due to received reports, the confidence value associated with a speed camera is also designed to vary in time, or age, according to a predetermined decay function. This aging of the confidence value is depicted in FIG. 5.

It has been recognised that it is desirable to have different decay functions based on the type of the speed camera. For example, and as shown in FIG. 5, a fixed speed camera (shown as a dashed line) ages at a slower rate than a mobile speed camera (shown as a solid line). This is to reflect the reality that a mobile speed camera will in all likelihood have a significantly shorter lifetime than a fixed speed camera. Any decay function can be used as desired, but it can include a linear, an exponential or a polynomial (e.g. quadratic, cubic, etc) decay function.

Figure 5:
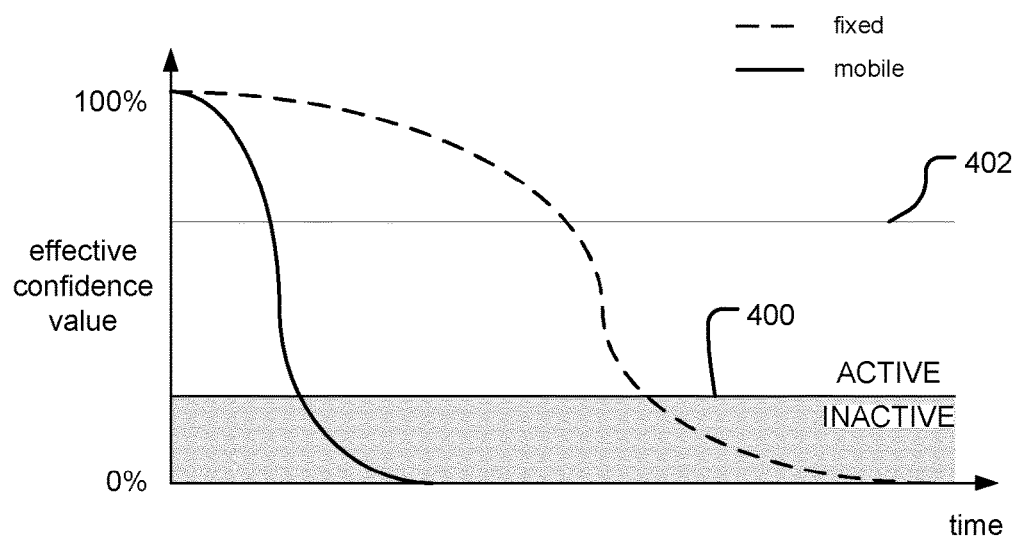
FIG. 5 shows how the confidence value for fixed and mobile speed cameras ages over time when no user reports are received.
Figure 6:
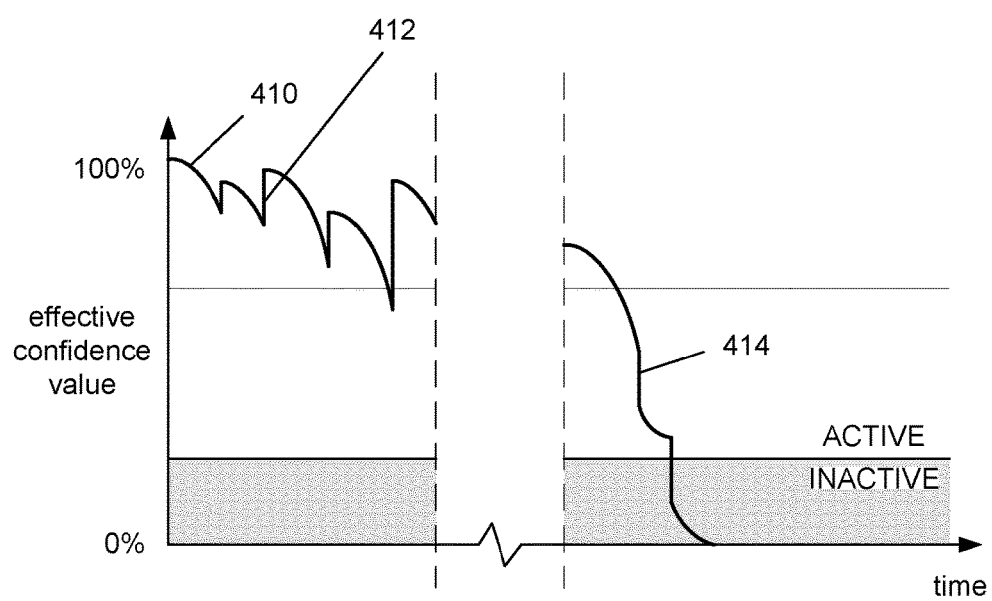
FIG. 6 shows how the confidence value for a speed camera varies over time when user reports are received.

As will be appreciated, the decay functions shown in FIG. 5 show how the confidence value associated with a fixed and mobile speed camera change when no reports for the cameras are received from users. In practice, reports are continually being received in relation to a speed camera, thereby pushing the confidence value for the camera up or down. This is shown in FIG. 6, wherein: 410 shows the confidence value decreasing according to the predefined decay function; 412 shows the confidence value increasing due to a received report; and 414 shows the confidence value decreasing due to a received report.

The manner by which the confidence value for a particular speed camera is determined will be described in more detail below following a description of the architecture of the system in accordance with an embodiment of the present invention with reference to FIG. 7.

Figure 7:
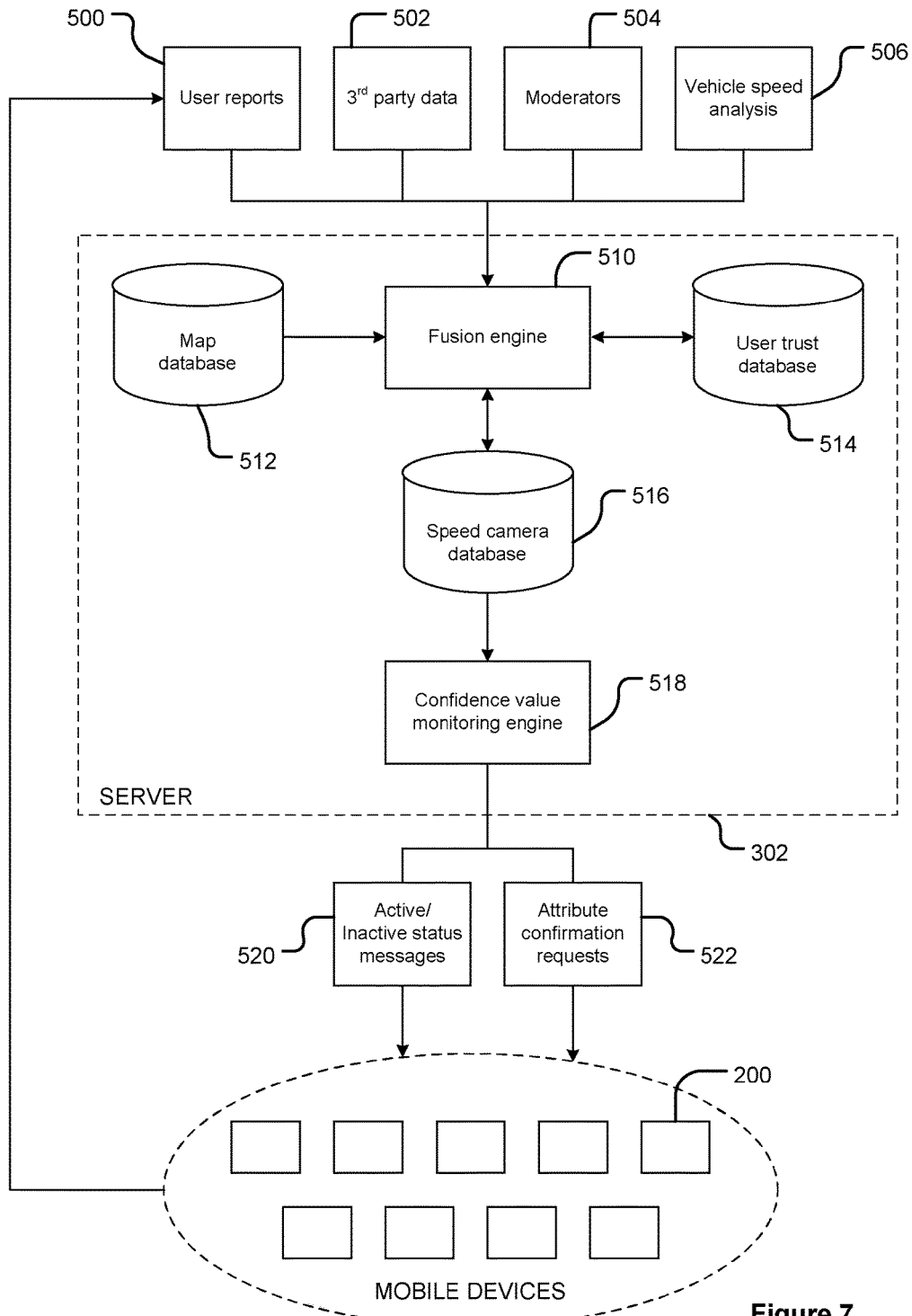
FIG. 7 is a schematic representation of an exemplary server system in accordance with the present invention.

As shown in FIG. 7, new speed cameras can be identified, and subsequently added to the speed camera database 516, in a number of ways.

For example, the existence of a speed camera may be determined following the receipt of a report from a user 500. The user reports may be generated in any manner on the navigation devices 200 as appropriate. For example, the navigation device may have a hard button or soft key (on a touch screen display) that can be pressed to automatically generate and transmit a report to the server 302. Such a report may include the location, speed and/or direction of travel of the navigation device (and thus the vehicle) at the time the button is pressed. Additional or more accurate information about a speed camera may subsequently be added to a report by the user before it is transmitted to the server 302. For example, the user may provide the actual speed limit for the road and may also adjust the location of the speed camera as appropriate (e.g. as the location of the device provided in the report will not always reflect the actual position of the speed camera, but will typically be a short distance before or after the actual position of the camera).

Speed camera data can also be obtained from various third parties 502, such as government data, other companies newspapers and other journalistic sources, etc. The existence of speed cameras can additionally be determined from sources, such as images collected by mobile mapping vehicles, and confirmed by moderators 504. It is also envisaged that location of speed cameras can be inferred from changes in the speed of individual vehicles or collections of vehicles 506.

New speed cameras, or modifications to attributes of existing speed cameras, obtained from one or more of the sources 500, 502, 504 and 506 are received at a fusion engine 510 of the server 302. It will be understood by those skilled in the art, however, that speed camera information may be obtained from other sources, in addition to those described above. At the fusion engine 510, the received speed camera information may be combined with one or more of: (i) information already existing in a speed camera database 516; (ii) information from a map database 512, e.g. to identify the location of a speed camera; and (iii) information from a user trust database 514, e.g. to provide an indication as to accuracy of reports previously received from a particular user. The information from all these sources is combined by the fusion engine 510 to produce new or amended speed cameras entries in the speed camera database 516.

For example, when a first report is received indicating the presence of a new speed camera, a new entry is made in the database. The attributes for the speed camera will be taken, at least in part, from the information contained in the report. Accordingly, the speed camera will be assigned a type: fixed or mobile, if available, or the type will be determined from the determined type confidence level as described below. The location, speed and driving direction for the camera will be that contained in the report if available, otherwise they will be left blank or inferred from other sources, such as the map database, data from mobile mapping vehicles, video from camera-equipped navigation devices, etc.

When a subsequent report relating to the same speed camera is received, the location of the speed camera will be adjusted according to a weighted average of the locations contained in the reports, the weighting being based on the trust level of the source of the reports, e.g. that of the user submitting the report. The speed limit of the speed camera will similarly be adjusted according to weighted average of the speeds contained in the reports based on trust level.

The fusion engine 510 also serves to generate a confidence value for new speed cameras that are added to the database 516, and modify the confidence value as necessary (e.g. following user reports) for speed cameras already existing in the database 516. A new confidence value is determined each time a new report is received, unless the report is received from a completely distrusted source.

The confidence value C for a speed camera is calculated by the fusion engine 510 as a compound value according to the following formula:

$$C = \gamma \sum_{i=1}^{N} c_i \lambda_i \qquad \text{Eqn. 1}$$

c is the partial confidences of attributes associated with the speed camera (e.g. location, speed, type and size),
$\lambda$ is a weight for each partial confidence, i.e. the contribution made by each confidence type to the total confidence, and
$\gamma$ is the weighted ratio between supporting and deletion reports.

The weights $\lambda$ are normalised such that:

$$\sum_{i=1}^{N} \lambda_i = 1 \qquad \text{Eqn. 2}$$

In a preferred example, the weight associated with the size confidence is 80%, the weight associated with the type confidence is 5%, the weight associated with the speed confidence is 5% and the weight associated with the location confidence is 10%. It will be appreciated, however, that the weight for each partial confidence can take any value as desired provided the requirement of Equation 2 is fulfilled.

The weighted ratio $\gamma$ is a number between 0 and 1 that represents the fraction of supporting reports received for a speed camera, i.e. those reports that support the hypothesis that a speed camera is present, in relation to all reports for that speed camera. The reports in the ratio are weighted such that a newer report carries more weight than an older report.

The partial confidences that are used to determine the confidence value C are: location confidence $c_L$; speed confidence $c_S$; fixed type confidence $c_{Tf}$; mobile type confidence $c_{Tm}$; and size confidence $c_N$.

The location confidence $c_L$ provides an indication as to the accuracy of the estimated location of the speed camera, and is determined based on a weighted average of the distance between the location contained in a report and the current speed camera location, the weighting being based on user trust level. The location confidence is calculated in a manner such that it is zero when the weighted average exceeds a maximum value.

The speed confidence $c_S$ provides an indication as to the accuracy of the estimated speed limit associated with the speed camera. The speed confidence $c_S$ is calculated using a statistical measure of the different speeds received in relevant reports, each report being weighted according to the trust level of the source, e.g. of the user. A report is deemed relevant if it contains speed limit information in a given speed range, e.g. 0 to 200 km/h, and is not older than a predetermined time period, e.g. 365 days.

The type confidence provides an indication as to the degree of confidence there is in the type attribute associated with a speed camera, e.g. whether it is a fixed speed camera or a mobile speed camera. As mobile and fixed speed cameras differ significantly in terms of their life and the number of associated reports, confidence is calculated differently for each type. The type attribute for a speed camera is set according to the last report from a moderator, or if there is no such report the type attribute is set using the relative sizes of $c_{Tm}$ and $c_{Tf}$, with a speed camera being said to be fixed if $c_{Tm} < c_{Tf}$, and conversely being said to be mobile if $c_{Tm} > c_{Tf}$.

The confidence that a speed camera is a mobile camera $c_{Tm}$ is set as 100% if the report came from a moderator, but is otherwise determined based on the relative number of reports indicating that a camera is a mobile speed camera to the total number of received reports and the age of the speed camera in the database 510. The $c_{Tm}$ value is calculated such that it is zero when the speed camera has been in the database 510 for more than a predetermined period of time, and such that each new report that is received for a speed camera decreases the confidence that the speed camera is a mobile speed camera. This reflects the situation that mobile speed cameras only exist for a short period of time, and thus if a speed camera exists for a relatively long period of time, then it becomes more likely that the camera is a fixed speed camera.

The confidence that a speed is a fixed camera $c_{Tf}$ is again set as 100% if the report came from a moderator, but is otherwise determined based on the age of the camera and also the number of reports received relating to the camera.

The size confidence $c_N$ is an indicator of the number of reports received in relation to a particular speed camera. The size confidence $c_N$ is calculated such that the first reports received for a particular speed camera contribute more to the confidence than subsequent reports.

As discussed above, the confidence value C decays over time according to a predetermined decay function. Thus, when a new report is received for a speed camera already existing in the database 510, the report changes the aged confidence value, rather than the previously calculated confidence value. This is achieved by the introduction of an effective confidence C', wherein:

$$C'(t) = f(t)C$$

The decay function $f(t)$ is, in a preferred embodiment, a linear decay function, wherein $f(t) = 1 - mt$. The gradient m is based on the type of the camera, such a fixed speed camera decays slower then a mobile speed camera. This aging of the confidence value is shown in FIG. 5, wherein the effective confidence value for a fixed speed camera (dashed line) and a mobile speed camera (solid line) is depicted, for speed cameras on which no reports are received.

The varying confidence values, or to be more accurate the effective confidence values, for each of the speed cameras in the database 510 are continually monitored by the confidence value monitoring engine 518 (as shown in FIG. 6). The purpose of the monitoring engine 518 is to determine when the confidence value for any speed camera falls below one of two predefined thresholds. These thresholds 400 and 402 can be seen in FIG. 5.

The first threshold 400 indicates when a speed camera in the database 510 is active or inactive. When a speed camera has a confidence value that means it is seen as active in the database, then mobile devices 200 provide warnings to users as to the presence of the speed camera and updates relating to the speed camera, e.g. changed attributes, are sent to the mobile devices 200. Conversely, when a speed camera has a confidence value that means it is seen as inactive, then mobile devices 200 do not provide any warnings to users since it is assumed that the speed camera no longer exists on the road. As will be appreciated, the use of the first threshold 400 limits the number of false positives being issued by devices.

When a speed camera falls below the threshold 400, then a message 520 is sent to users indicating that the speed camera is now inactive. The message 520 may include an identifier to identify the speed camera and an indicator that shows the speed camera is inactive. Messages 520 may be sent to all users as soon as the speed camera falls below the threshold level 400. Alternatively, messages 520 may just be sent to users in the vicinity of the speed camera, and other users are informed about the change in a periodic update of the database 516. This reduces the number of active/inactive status messages that are sent out to users, and thus the amount of bandwidth needed for operation of the system.

The second threshold 402 indicates the beginning of an intermediate level of confidence, which extends between the thresholds 400 and 402. It is desirable for any speed cameras that fall into this region to quickly confirm the presence or absence of a speed camera, and therefore increase the confidence value for the camera above the threshold 402 or decrease the confidence value below the threshold 400. Accordingly, when the confidence value for a speed camera falls below the threshold 402, messages 522 are sent to users requesting confirmation of the presence of a speed camera in the database 510. The messages 522 can also request that a user confirm a particular attribute associated with the speed camera. For example, if the confidence value for a speed camera is reduced due to a lack of confidence in only one attribute, then the messages may ask a user to confirm this attribute. As will be appreciated, the mobile devices 200 periodically provide their current position to the server 302, and may also provide a planned route to the server 302. This information is used by the server 302 to only send the messages 522 to mobile devices 200 that will pass the associated speed camera.

As will be seen from FIG. 6, the reports received from users in response to the attribute confirmation requests 522 are supplied to the fusion engine 510 to update the relevant speed cameras in the database 516.

The use of active feedback from users can also be used to confirm the presence of speed cameras that are inferred indirectly, e.g. from analysing vehicle speed data as discussed above (506). For example, once a speed camera is determined from analysing vehicle speed data it can be assigned a confidence value that will always fall between the thresholds 400 and 402. Thus, the presence of the speed camera will quickly be confirmed or rejected based on the responses of users to the messages 522 that are sent out by the server 302.

In other embodiments, instead of sending messages 520 and 522 to the mobile devices 200, each time the confidence value of a speed camera changes due to a received user report 500 or the like (and not only due to natural decay), then a message is sent to the mobile devices including a first time indicating when the confidence value with fall below the second threshold 402 based on the decay function associated with the camera, and a second time indicating when the confidence value will fall below the first threshold 400 based on the decay function associated with the camera. The message may also include a third time value indicating when the confidence value falls to a level where the camera is to be deleted from the database on the mobile devices 200.

The mobile devices will then perform the actions associated with these time values. In other words, at the first time, the mobile devices 200 will generate a message to show (or provide in some other way) to the user asking for confirmation as to the existence of the speed camera. Similarly, at the second time, the mobile devices 200 will stop providing warnings to the driver relating to the speed camera.

It will be appreciated that whilst various aspects and embodiments of the present invention have heretofore been described, the scope of the present invention is not limited to the particular arrangements set out herein and instead extends to encompass all arrangements, and modifications and alterations thereto.

For example, whilst the embodiments in the foregoing detail description refer to specifically to a system for maintaining a database of speed cameras, it will be understood that a similar system could be used with other types of points of interest or dynamic data. In particular, data in an electronic map that is temporary in nature, such as the availability of parking areas, either individual spaces or multiple spaces in a parking lot, and the availability of electric vehicle charging stations could be maintained using a similar system to that described above. The system could also be used to control dynamic advertising displays.

In this regard, whilst the embodiments in the above detailed description refer to the use of a predetermined decay function to age the confidence values, it will be appreciated that any type of function could be used in the system. For example, a growth function could be used that increases the confidence value with time, or a more complex function that both increases and decreases the confidence value with time.

Similarly, whilst embodiments described in the foregoing detailed description refer to GPS, it should be noted that the mobile devices 200, e.g. navigation apparatus, may utilise any kind of position sensing technology as an alternative to, or indeed in addition to, GPS. For example, the navigation apparatus may utilise other global navigation satellite systems, such as the European Galileo system. Equally, it is not limited to satellite-based systems, but could readily function using ground-based beacons or other kind of system that enables the device to determine its geographic location.

It will also be well understood by persons of ordinary skill in the art that whilst the preferred embodiment may implement certain functionality by means of software, that functionality could equally be implemented solely in hardware (for example by means of one or more SICs (application specific integrated circuit)) or indeed by a mix of hardware and software.

Lastly, it should be noted that whilst the accompanying claims set out particular combinations of features described herein, the scope of the present invention is not limited to the particular combinations hereafter claims, but instead extends to encompass any combination of features or embodiments herein disclosed irrespective of whether or not that particular combination has been specifically enumerated in the accompanying claims at this time.

The invention claimed is:

1. A method of processing data for maintenance of a database of speed limit enforcement devices, each speed limit enforcement device represented in the database having a device type, at least one attribute and a time-varying confidence value indicative of the accuracy of the at least one attribute associated therewith, the method comprising:
receiving a report relating to an attribute of a speed limit enforcement device;
adjusting the confidence value associated with the speed limit enforcement device in accordance with the received report;
selecting, based on the device type of the speed limit enforcement device, a predefined function from among two or more predefined functions, each of the two or more predefined functions having a different decay profile for adjusting the confidence value associated with the speed limit enforcement device with time;
adjusting the confidence value associated with the speed limit enforcement device with time in accordance with the predefined function; and
transmitting information relating to the speed limit enforcement device to a remote device based on the confidence value associated with the speed limit enforcement device.

2. The method of claim 1, wherein the at least one attribute associated with a speed limit enforcement device comprises one or more of: an active status of the device; a device type; a location of the device; a speed limit; a driving direction indicating with which direction of vehicular travel the device operates; and a time period during which the device is operational.

3. The method of claim 1, wherein the at least one attribute associated with a speed limit enforcement device comprises a speed limit, wherein the speed limit is one of: (i) the actual speed limit for the road on which the speed limit enforcement device is located; and (ii) derived from position data received from vehicles travelling along the road on which the speed limit enforcement device is located.

4. The method of claim 1, wherein speed limit enforcement devices are added to and/or modified in the database based on identifying a change in speed indicative of the presence of a speed limit enforcement device from position data relating to the position of at least one vehicle at a plurality of times when travelling along a route.

5. The method of claim 1, wherein the information relating to a speed limit enforcement device transmitted to a remote device comprises an indication that alerts indicating the presence of the speed limit enforcement device should no longer be issued to a user by the remote device.

6. The method of claim 5, wherein the indication that alerts indicating the presence of the speed limit enforcement device should no longer be issued to a user is transmitted to the remote device when the confidence value for the speed limit enforcement device falls below a first predetermined threshold.

7. The method of claim 1, wherein the predefined function comprises at least one of: a linear function; an exponential function; and a polynomial function.

8. The method of claim 1, wherein the predefined function comprises a decay function, a growth function, or a combination thereof.

9. The method of claim 1, wherein the initial confidence value associated with a speed limit enforcement device is based on the source of the speed limit enforcement device.

10. The method of claim 1, wherein each speed limit enforcement device represented in the database has a plurality of attributes associated therewith, and the confidence value associated with a device is a combined confidence value indicative of the accuracy of each of the attributes.

11. The method of claim 1, wherein the confidence value is calculated using one or more of: the number of positive reports received from the remote devices; the number of negative reports received from the remote devices; the ratio of positive reports received to negative reports; and the age of each report.

12. The method of claim 1, wherein the information transmitted to a remote device comprises at least one of: a request to provide confirmation of the presence of the speed limit enforcement device; a request to provide confirmation of an attribute of the speed limit enforcement device; and data that causes such a request to be generated on the remote device.

13. The method of claim 12, wherein the request to provide confirmation of at least one of the presence and an attribute of the speed limit enforcement device is transmitted to the remote device when the confidence value for the speed limit enforcement device falls below a second predetermined threshold.

14. The method of claim 1, wherein the information relating to the speed limit enforcement device transmitted to the remote device comprises a time when alerts in relation to the speed limit enforcement device are no longer to be issued to a user on the remote device.

15. The method of claim 1, wherein the device type indicates that the device is fixed or mobile.

16. The method of claim 15, wherein the predefined function is a decay function and a first decay function is used for fixed speed limit enforcement devices and a second decay function is used for mobile speed limit enforcement devices, the first decay function indicating a slower decay than the second decay function.

17. A server system arranged to process data for maintenance of a database of speed limit enforcement devices, each speed limit enforcement device represented in the database having a device type, at least one attribute and a time-varying confidence value indicative of the accuracy of the at least one attribute associated therewith, the system comprising memory for storing the database of speed limit enforcement devices and at least one processor configured to:
receive a report relating to an attribute of a speed limit enforcement device;
adjust the confidence value associated with the speed limit enforcement device in accordance with the received report;
select, based on the device type of the speed limit enforcement device, a predefined function from among two or more predefined functions, each of the two or more predefined functions having a different decay profile for adjusting the confidence value associated with the speed limit enforcement device with time;
adjust the confidence value associated with the speed limit enforcement device with time in accordance with the predefined function; and transmit information relating to the speed limit enforcement device to a remote device based on the confidence value associated with the speed limit enforcement device.

18. A non-transitory computer readable medium comprising computer program code adapted, when said computer program code is run on a computer, to cause the computer to perform a method of processing data for maintenance of a database of speed limit enforcement devices, each speed limit enforcement device represented in the database having a device type, at least one attribute and a time-varying confidence value indicative of the accuracy of the at least one attribute associated therewith, the method comprising:

receiving a report relating to an attribute of a speed limit enforcement device;

adjusting the confidence value associated with the speed limit enforcement device in accordance with the received report;

selecting, based on the device type of the speed limit enforcement device, a predefined function from among two or more predefined functions, each of the two or more predefined functions having a different decay profile for adjusting the confidence value associated with the speed limit enforcement device with time;

adjusting the confidence value associated with the speed limit enforcement device with time in accordance with the predefined function; and transmitting information relating to the speed limit enforcement device to a remote device based on the confidence value associated with the speed limit enforcement device.

\* \* \* \* \*